(12) United States Patent
Kotler et al.

(10) Patent No.: US 8,370,767 B2
(45) Date of Patent: Feb. 5, 2013

(54) LIST AUTHORING SURFACE

(75) Inventors: Matthew J. Kotler, Sammamish, WA (US); Ned B. Friend, Seattle, WA (US); Erez Kikin-Gil, Redmond, WA (US); Charles W. Parker, Sammamish, WA (US); Jesse Clay Satterfield, Seattle, WA (US); Igor Zaika, Seattle, WA (US); Marta Rey-Babarro, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 182 days.

(21) Appl. No.: 12/820,676

(22) Filed: Jun. 22, 2010

(65) Prior Publication Data
US 2011/0314418 A1 Dec. 22, 2011

(51) Int. Cl.
G06F 3/048 (2006.01)
G06F 7/00 (2006.01)
(52) U.S. Cl. ........ 715/810; 715/205; 715/256; 715/739; 715/763; 715/780; 707/810
(58) Field of Classification Search .......... 715/200, 715/201, 202, 203, 205, 206, 207, 208, 209, 715/210, 226, 229, 234, 253, 256, 265, 273, 715/700, 705, 731, 760, 762, 763, 204, 231, 715/243, 739, 744, 752, 780, 810; 707/705, 707/708, 739, 771, 778, 790, 805, 912, 953, 707/956, 964, 999.001, 999.1
See application file for complete search history.

(56) References Cited

U.S. PATENT DOCUMENTS

| | | | |
|---|---|---|---|
| 6,525,749 B1 | 2/2003 | Moran et al. | |
| 6,680,675 B1 | 1/2004 | Suzuki | 340/988 |
| 7,366,991 B1* | 4/2008 | Snapkauskas et al. | 715/762 |
| 7,472,357 B1* | 12/2008 | Satterfield et al. | 715/859 |
| 7,565,340 B2 | 7/2009 | Herlocker et al. | |
| 8,108,206 B2* | 1/2012 | Hufnagel et al. | 704/9 |
| 2002/0118225 A1* | 8/2002 | Miksovsky | 345/762 |
| 2005/0091578 A1 | 4/2005 | Madan et al. | 715/512 |
| 2006/0239248 A1 | 10/2006 | Hawk et al. | |
| 2006/0259511 A1 | 11/2006 | Boerries et al. | |
| 2007/0055936 A1* | 3/2007 | Dhanjal et al. | 715/700 |
| 2007/0073810 A1 | 3/2007 | Adams et al. | |
| 2007/0074121 A1* | 3/2007 | Mullender et al. | 715/744 |

(Continued)

OTHER PUBLICATIONS

Mistry, Pranav, et al. "Augmenting Sticky Notes as an I/O Interface", MIT Media Laboratory, 20 Ames Street, Cambridge, MA 02139. Published Jul. 14, 2009, http://fluid.media.mit.edu/assets/_pubs/p2217_mistry.pdf, 10 pages.

(Continued)

*Primary Examiner* — Maikhanh Nguyen
(74) *Attorney, Agent, or Firm* — Merchant & Gould

(57) ABSTRACT

A list authoring surface (LAS) is provided that includes a lightweight user interface component for entering, displaying, manipulating, and providing reminders for one or more tasks that takes the place of hand-written notes, scraps of paper, or "sticky" notes. The list authoring surface may be deployed across a multitude of software applications and may be readily accessed anywhere on a stationary or mobile desktop or display screen. Information may be manually or automatically entered into the list authoring surface user interface. An event timeline that uses a "fuzzy" reminder method allows for reminders to be associated with tasks where some tasks must be accomplished or must occur at hard dates/times, but where other tasks may be accomplished or may occur during soft or "fuzzy" date/time ranges.

18 Claims, 11 Drawing Sheets

U.S. PATENT DOCUMENTS

| | | | |
|---|---|---|---|
| 2007/0106931 A1 | 5/2007 | Vartiainen et al. | |
| 2007/0130369 A1 | 6/2007 | Nayak | |
| 2007/0143376 A1 | 6/2007 | McIntosh | |
| 2007/0162907 A1 | 7/2007 | Herlocker et al. | |
| 2007/0245229 A1 | 10/2007 | Siedzik et al. | |
| 2007/0288279 A1 | 12/2007 | Haugen et al. | |
| 2008/0076400 A1 | 3/2008 | Moosavi et al. | 455/418 |
| 2008/0082651 A1* | 4/2008 | Singh et al. | 709/224 |
| 2008/0091782 A1 | 4/2008 | Jakobson | |
| 2008/0175104 A1 | 7/2008 | Grieb et al. | |
| 2009/0055415 A1 | 2/2009 | Golds et al. | |
| 2009/0287718 A1 | 11/2009 | Motoyama et al. | |
| 2009/0287731 A1 | 11/2009 | Motoyama et al. | |
| 2009/0319608 A1 | 12/2009 | Anil et al. | 709/204 |
| 2009/0320025 A1 | 12/2009 | Ferguson et al. | |
| 2010/0004921 A1 | 1/2010 | Hufnagel et al. | 704/9 |
| 2011/0296322 A1* | 12/2011 | Dhanjal et al. | 715/760 |
| 2012/0035925 A1 | 2/2012 | Friend et al. | |

OTHER PUBLICATIONS

Radi, Harald, et al. "Towards Alternative User Interfaces for Capturing and Managing Tasks with Mobile Devices", *MoMM* 2008, Nov. 24-26, 2008, Linz, Austria. http://www.mayrhofer.eu.org/downloads/pubications/MoMM2008-Towards-Mobile-Task-Management.pdf, 4 pages.

Smartcode, "Dynamic Notes 3.46", Published 2008, http://dynamic-notes.smartcode.com/info.html, 2 pages.

SnapFiles, "SmartToDo Personal Task Manager", Published Jan. 23, 2009, http://www.snapfiles.com/get/smarttodo.html, 3 pages.

Back, Maribeth, et al. FX Palo Alto Laboratory, Palo Alto, California. Published 2009. http://www.fxpal.com/publications/FXPAL-PR-09-499.pdf, 12 pages.

SolutionWatch, "8apps: Social Networking for Productive People", Published 2010, http://www.solutionwatch.com/546/8apps-social-networking-for-productive-people/, 18 pages.

Chris Prately, Getting Organized Using Onenote Note Flags, Published Apr. 23, 2005, http://blogs.msdn.com/chris_prately/archive/2005/04/23/getting-organized-using-onenote-note-flags.aspx, 15 pages.

Kreifelts, Thomas et al., "Sharing To-Do Lists with a Distributed Task Manager", published in ECSCW '93, Proc. Third European Conference on Computer-Supported Cooperative Work on Sep. 15-17, 1993, Milano, Italy. Reprinted by permissions of Kluwer Academic Publishers, http://citeseerxist.psu.edu/viewdoc/download;iessionid=8058BDB7D6CD9F588E557272F2BB39C8?doi=10.1.1.38.2100&rep=rep1&type=pdf, 16 pages.

Bellotti, Victoria et al., "Taking Email to Task: The Design and Evaluation of a Task Management Centered Email Tool", Palo Alto Research Center, published Apr. 10, 2003, http://www.sigchiorg/chi2003/docs/takingemail.pdf, 8 pages.

To-Do List Pro—Published Date: Jul. 23, 2010, http://appshopper.com/productivity/to-do-list-pro-time-tracker, 2 Pages.

International Search Report and Written Opinion issued Feb. 9, 2012 in PCT/US2011/040772 filed Jun. 16, 2011.

Conley, K. et al. Towel: Towards an Intelligent To-Do List, In: the AAAI Spring Symposium on Interaction Challenges for Artificial Assistants, 2007, 7 pages.

* cited by examiner

LIST AUTHORING SURFACE

BACKGROUND

With the advent of computers and computer software, a number of advancements have been made to help people manage both their working and non-working lives. To help people who are trying to juggle numerous tasks at work, at home, and in between, electronic tasks and calendaring programs have been developed to assist with the often daunting task of maintaining, tracking and remembering all the things that must be accomplished on a daily basis. Unfortunately, a great number of people are often reduced to handwriting a multitude of notes to themselves on scraps of paper, on notepads, on "sticky" notes and the like. It is not uncommon to see numerous notes adhered to a person's desk, computer screen, home refrigerator, and the like to remind the person to handle one or more tasks. While the person may have access to and may utilize a good electronic task or calendaring program, he or she simply cannot resist handwriting numerous notes to track those things he or she believes are "really" important.

It is with respect to these and other considerations that the present invention has been made.

SUMMARY

Embodiments of the present invention solve the above and other problems by providing a list authoring surface (LAS) that includes a lightweight user interface component for entering, displaying, editing, manipulating, and providing reminders for one or more tasks, events, activities, or pieces of information that takes the place of previous/existing electronic task management systems, hand-written notes, scraps of paper, "sticky" notes, memory joggers, and the like. The list authoring surface may be deployed across a multitude of software applications and may be readily accessed anywhere on a stationary or mobile desktop (e.g., on a mobile telephone or other handheld or mobile computing device) or display screen. Information may be manually or automatically entered into the list authoring surface user interface component. Information entered into the list authoring surface may be stored remotely, and thus, the list authoring surface user interface may be deployed on any number of stationary or mobile computing devices and across any number of software applications so that it is like an electronic "sticky" note that follows a user always providing him or her with a list of those tasks, events, activities, or pieces of information he or she considers most important for any number of reasons.

Once information is populated into the list authoring surface, metadata and natural language processing may be applied to the information to allow for efficient filtering, editing, searching, sorting and other similar manipulation. An event timeline that uses a "fuzzy" reminder method allows for reminders to be associated with tasks, events and activities where some tasks, events and/or activities must be accomplished or must occur at hard dates/times, but where other tasks, events and/or activities may be accomplished or may occur during soft or "fuzzy" date/time ranges, or during no particular date/time range at all.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
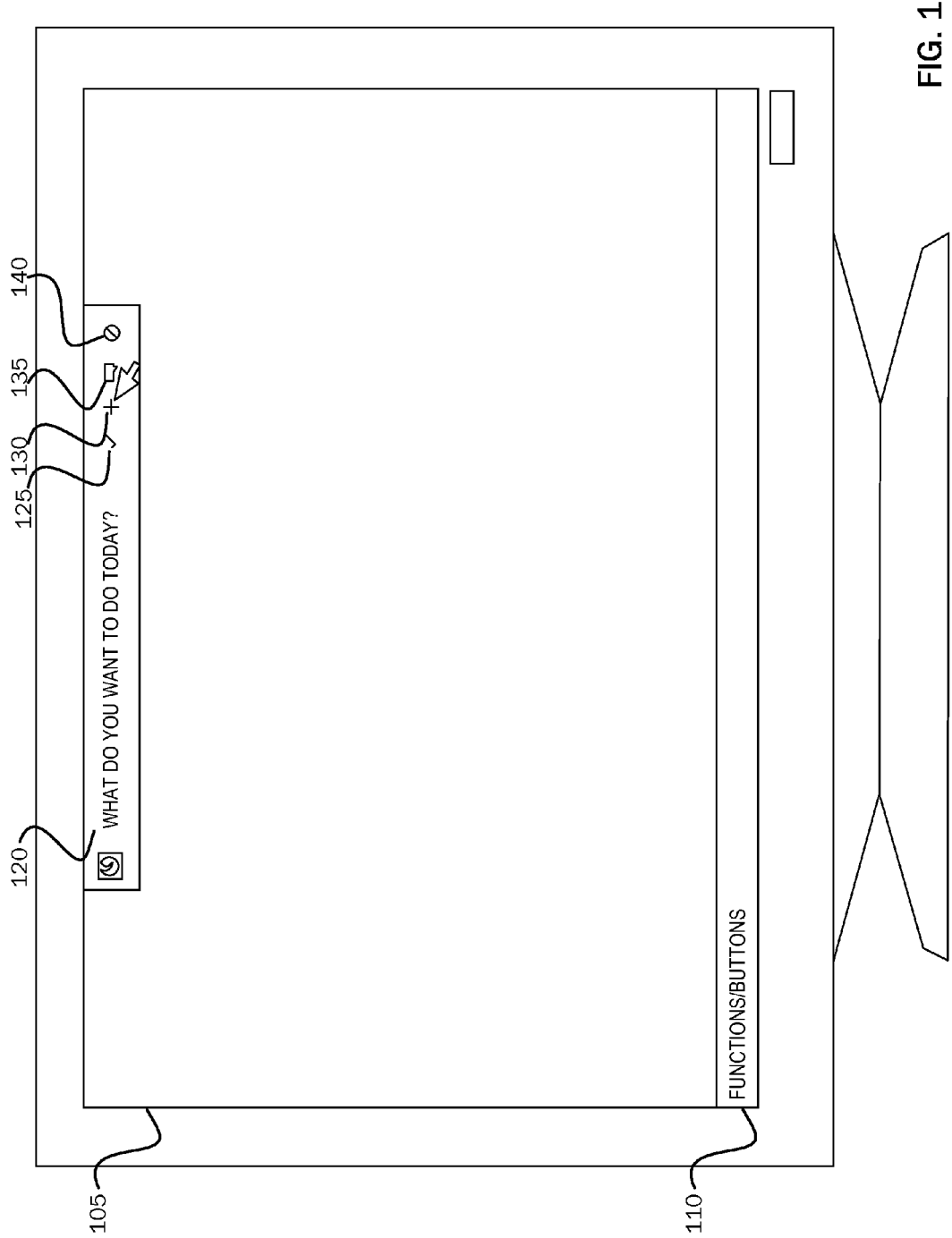
FIG. 1 is a simplified block diagram illustrating a list authoring surface user interface deployed on a display screen of a computer monitor.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to a list authoring surface (LAS) that is a software application or module that enables a lightweight user interface component for entering, displaying, editing, manipulating, and providing reminders for one or more tasks, events, activities, or pieces of information that takes the place of hand-written notes, scraps of paper, "sticky" notes, memory joggers, and the like. FIG. 1 is a simplified block diagram illustrating the list authoring surface user interface deployed on a display screen of a computer monitor. The list authoring surface includes a lightweight user interface 120 (also referred to herein as a list user interface) that may be deployed across a number of software applications and that may be displayed on stationary and/or mobile computing device desktops or display areas. For example, as illustrated in FIG. 1, the list authoring surface user interface (LASUI) is shown deployed on a display screen 105 of a stationary computer monitor. As should be appreciated, the display screen 105 may be illustrative of a display space associated with a computer operating system, or a display space associated with one or more software applications, for example, word processing applications, spreadsheet applications, slide presentation applications, notes applications, calendaring applications, contacts applications, and the like. A row of functions/buttons 110 is illustrated at the bottom edge of the display screen 105 for providing access to one or more functionalities associated with an example software application or operating system. As should be appreciated, the configuration and location of user interface components illustrated in FIG. 1 are for purposes of example only and are not limiting of other configurations that may be possible. That is, the LASUI 120 may be deployed along an upper edge of the display screen 105, as illustrated in FIG. 1, or the LASUI 120 may be deployed at other locations in the display screen as required by a user for effective utilization of the display screen.

According to embodiments, the list user interface 120 of the list authoring surface may be utilized as an electronic note, scrap of paper, note pad, "sticky" note, and the like that is associated with one or more software application displays for entering either manually or automatically list items, such as tasks, events, activities or other pieces of information, that a user might otherwise jot down on a piece of paper, note or other media for keeping in the forefront such information considered important to the user or for reminding the user. In addition to entering information into the user interface 120, the user interface 120 may be used for quick capture of information from opened documents and in association with opened applications so that the user does not have to leave a current application to launch a task entry user interface. Indeed, the list authoring surface UI 120 may be associated with a variety of electronic files, such as electronic documents, electronic mail items, contacts items, social networking information, and the like.

As illustrated in FIG. 1, one or more functionality buttons or controls 125, 130, 135, 140 may be provided in the list authoring surface UI 120 for editing or otherwise manipulating information contained in the UI 120. For example, a control 125 may be utilized for "checking off" completed tasks, a control 130 may be utilized for adding additional tasks, events or other information, a control 135 may be utilized for importing information or for annotating information to be stored or displayed in the user interface 120, and a variety of other controls 140 may be provided for other types of editing, sorting, filtering, searching, and the like information contained in the user interface 120.

According to an embodiment, one such control may be used to set the computer with which the list authoring surface is utilized to a "do not disturb" mode so no new email items, instant messaging (IM) items, or other distractions would come to the list authoring surface when the "do not disturb" mode is activated. Another such control 140 may allow a "snooze" mode to be applied to the task currently displayed so that a new task could be displayed instead and so that a user would not have to decide what to do with respect to the "snooze" task. That is, the user could hold the task by applying the "snooze" mode. In addition, the "snooze" mode may be used to filter out information not relevant to the current task only. For example, if a user applies the "snooze" mode to a task of "Plan morale event," and if the user's current task is "Redesign product," and the user gets an email from his/her supervisor about this project, the email about the task of "Redesign project" may be displayed, but emails about the "Plan morale event" task may not be displayed to the user.

Figure 2:
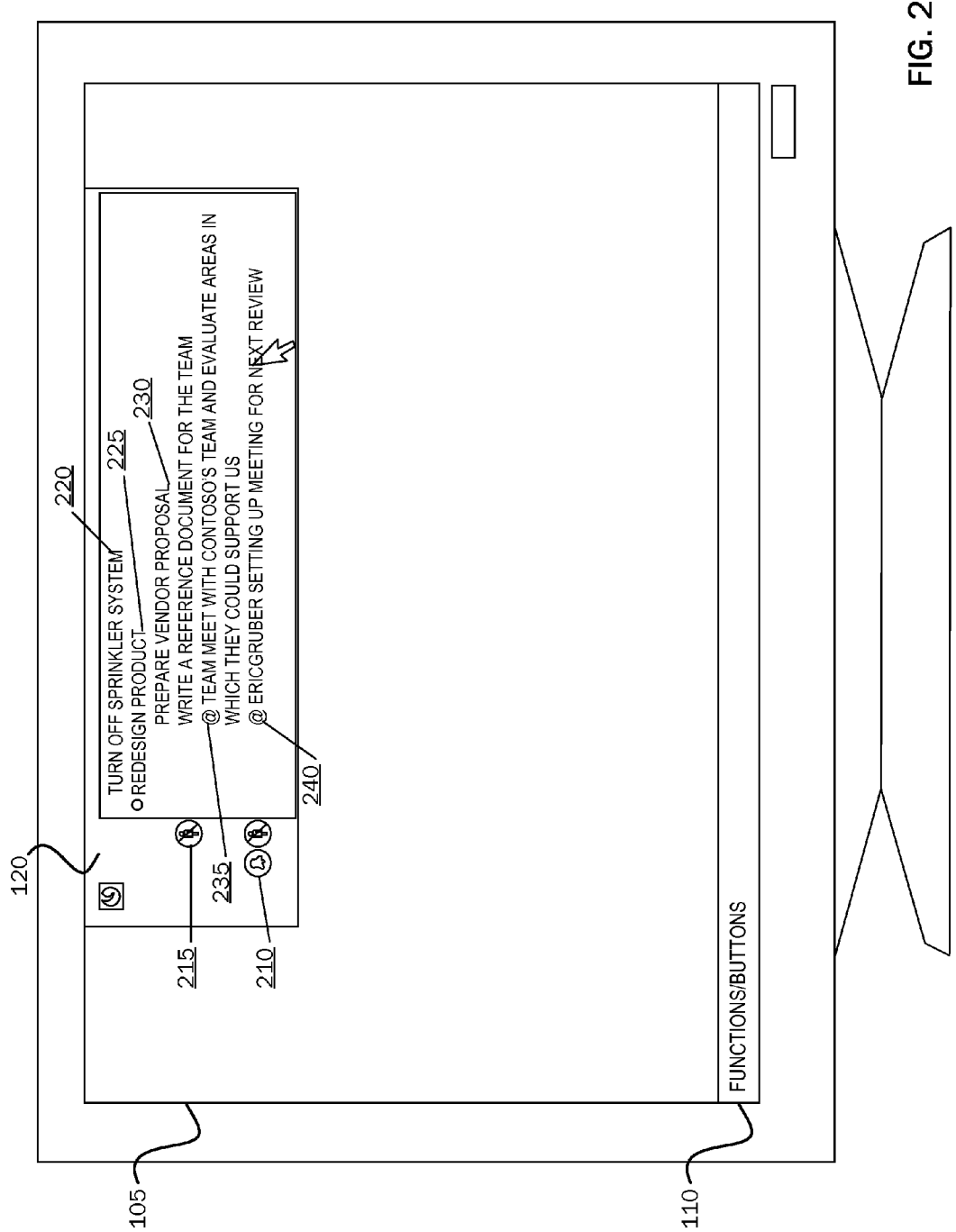
FIG. 2 is a simplified block diagram illustrating a list authoring surface user interface populated with one or more tasks, events, activities, or pieces of information deployed on a display screen of a computer monitor.

Referring now to FIG. 2, the list authoring surface user interface 120 is illustrated in an expanded form showing a variety of list items, for example, tasks, events, activities or other pieces of information, that have been entered either manually or automatically through information capture into the list authoring surface. For example, a first entry 220 of "Turn off sprinkler system" is illustrative of a task a user may enter into the list authoring surface user interface 120 to remind the user to handle this task when he returns home. For another example, a second entry 225 of "Redesign product" is illustrated having a number of subtasks 230 associated with the main task 225. Items displayed in the LAS UI 120 may be displayed according to one or more specified display arrangements, for example, based on designated time of performance, most recent on top, top 5 items as designated by a user, and the like. Such display arrangements may also apply to pivoted displays as described below with reference to FIG. 3.

Advantageously, entering and editing information into the list authoring surface UI 120 is easy and efficient. For example, information may be typed into the UI in a similar manner as entering a bulleted list of items in a word processing document. That is, the user may enter an item, select the "enter" key, "tab" key, or the like, and subsequent entries will be placed in the next row or sentence in the UI 120, but still have all of the benefits of any applied metadata. For example, the LAS UI may be formatted such that a simple carriage return or tab selection may create a hierarchy in entered list items that may be beneficial to the user. For example, the user may enter a first task of "Plan dinner party," followed by a carriage return or tab and then the entry of "Reserve restaurant," followed by another carriage return and the entry "Review menu offerings." By applying a hierarchical formatting to the entered items, the second two items may automatically be listed beneath and indented relative to the first item to create a displayed hierarchical relationship between the items.

According to embodiments, once data or other information is populated into the list authoring surface UI 120, metadata, for example, the phrase "@Team" 235, 240 may be entered into the LAS UI 120 as one or more text entries and may be applied to key words, key terms, key phrases, or other information components of a task list item to allow for structuring, editing, filtering, searching, sorting, or other automated manipulation of task list items (i.e., tasks, text or information) contained in the UI 120. Alternatively, metadata items may be selected from a menu of metadata items for application. For example, the metadata "@Team" may be applied to the task "Meet with Contoso's team and evaluate areas in which they could support us" to indicate that the example task is one of one or more tasks to be completed by a given team. In contrast, the metadata "@EricGruber" is applied to a task of "Setting up meeting for next review" to indicate that task is associated with a particular person.

Many other types of metadata may be applied to information in the list authoring surface UI 120. For example, while the example "@" symbol is used above to associate a task with a person or group, the "#" symbol may be used for tagging a task or other information with random metadata. For other examples, the "$" could be used to tag monetary information, the "&" symbol could be used to tag dates or time. As should be appreciated, any of a great number of such metadata types and symbols could be used, and the foregoing are for purposes of example only. Advantageously, such metadata items may be associated with information in the list authoring surface UI without entering another text or data entry field or without launching any other user interface component. As also should be appreciated, such metadata applied to various information in the list authoring surface UI 120 will allow for sorting, searching, filtering or otherwise manipulating the information contained in the UI 120. For example, using the metadata "@Team" may allow a sorting on all tasks, events, or other pieces of information to be performed by or that are associated with the team of personnel associated with the metadata "@Team."

In addition to using applied metadata to allow manipulation of information in the list authoring surface UI 120, applied metadata may also be used to add or manipulate data in other list authoring surface UIs of other users. For example, if a first user enters or captures a given piece of information in her list authoring surface UI, and then applies a metadata item such as "@Sarah" to the information, according to an embodiment, "Sarah" may now have the tagged information automatically populated into her list authoring surface UI so that she sees the tagged information as well.

As should be appreciated, an almost limitless amount and type of metadata may be applied to various pieces of information entered in the list authoring surface. For example, such metadata terms as date, time, location, name, address, telephone number, alphanumeric, audio, video and the like may be applied to one or more words, phrases, data, files, and the like for allowing future editing, sorting, searching, or manipulation of the information contained in the list authoring surface. For example, if a metadata type of "date" is applied to all dates contained in the list authoring surface UI 120, such metadata may be utilized for tagging dates contained in the UI 120 to allow a user to filter, sort, or search data contained in the UI 120 based on date. For example, a user may desire to sort all information contained in the UI 120 by date to allow the user to quickly see those tasks or events that are occurring or that should be performed today.

In addition to the application of metadata to one or more words, phrases or other pieces of information, natural language processing may be utilized for tagging and/or applying metadata to information contained in the list authoring surface. For example, if a phrase such as "Meet at Bob's Pizza Parlor at 6:00 p.m. on Friday" is entered into the list authoring surface user interface 120 a natural language processor may be applied to the phrase to parse the words to determine whether any of the words are associated with a particular information or data type. For example, each word or combination of the words in the example task item may be parsed to determine whether any particular information type is involved. For example, the words "Bob's Pizza Parlor" may be tagged as a name of a business, the time "6:00 p.m." may be tagged as a time, and the day "Friday" may be tagged as a particular day. A natural language processor may parse such phrases into one or more words, and the one or more words may be used for searching dictionaries or stores of words for matching the parsed words with various known words such as restaurant names, times, days, and the like. Once the natural language processor identifies certain words or phrases as belonging to information types, those words or phrases may be tagged with metadata so that the words or phrases may be utilized for searching, sorting, filtering editing or otherwise manipulating the information, as described above.

In addition to such manipulation of listed information, allowing for acting on the listed information is equally important. For example, functionality buttons and controls may be exposed in the list authoring surface UI to allow actions on listed items. For example, the listing of a contact item, such as "Bob's Pizza Parlor" may cause the listing of a "call" button which when selected causes a telephone program to call the listed contact, or an "email," "text" or similar button which when selected may allow an email or text message to be sent to the contact, etc. As should be appreciated, many other types of action controls may be exposed for listed items. For example, a control for adding listed names and related information to a contacts folder may be exposed, and the like.

In addition to natural language processing, other methods for recognizing and utilizing particular pieces of information may be used. For example, other methods may include, parsing text or data and passing the parsed text or data to one or more recognizer modules. Still other methods may include use of data analytics to analyze all of the data on the server and show auto-complete or other information (e.g., everyone who enters "Christmas" also happens to tag it with "#holiday" and perhaps you the user would like to as well). In addition, search may be used, for example, entering "Bob's Pizza Parlor" would cause a detection/identification by doing a search and seeing that "Bob's Pizza Parlor" is actually a restaurant that has an associated URL such as www.bobspizzaparlor.com.

According to embodiments, in addition to metadata tags, other list item attributes, including other forms of metadata, may be applied to list items entered into the list authoring surface. For example, list item attributes, such as team attribute, person attribute, date attribute, time attribute, location attribute, name attribute, address attribute, telephone number attribute, alphanumeric attribute, audio attribute, video attribute, and the like may be applied to a given list item. As should be appreciated, the list item attributes may be extensible and customizable, for example, price attributes, location in a store of items on a purchase list, etc. For example, a list item of "@Team1Meet at 2:00 pm to discuss project" may be additionally annotated with a list item attribute of a person's name, such as "Joe," to create a modified list item of "@Team1Meet at Joe's office at 2:00 pm to discuss project." The list authoring surface may then associate the first metadata item of "@Team" with the list item attributes of "2:00 pm" and/or "Joe's office" to generate a task for display in the list user interface 120 of all users who are members of "@Team1.". Association of such metadata items and list item attributes may allow the task to be used more effectively. For example, the resulting task item, may allow the list authoring surface to retrieve information about the members of "Team1," for example, calendaring information to determine whether the members are available at "2:00 pm," and/or the list authoring surface may retrieve contact information to determine the location of "Joe's office." Such information may be automatically added to the list authoring surface 120 as a pivot item out from the resulting task. As should be appreciated, these are only examples of the many ways in which metadata items and other list item attributes may be associated to enhance the effectiveness of task items in the list authoring surface.

Information entered into the list authoring surface UI 120 and tagged or grouped according to one or more metadata types, list item attributes or in association with a natural language processor, as described above, may then be utilized in a variety of helpful ways, including generation and display of resulting tasks. For example, date and/or time annotation or tagging applied to tasks, events, activities or other pieces of information (hereafter referred to as "tasks") may be utilized for manipulating, e.g., editing, sorting, searching, or otherwise manipulating, tasks and related information contained in the list authoring surface according to any applied metadata or list item attributes, e.g., date/time, people, teams, etc. In addition, tasks annotated with a date and/or time metadata may be organized in an events timeline and may be further annotated to help the user accomplish or otherwise handle tasks along a prescribed timeline. As referred to herein, timeline may be broadly defined to include any time representation, including dates, times, calendar information, seasons, years, etc. For example, certain tasks may have hard deadlines, for example, a doctor's appointment on a specific date and time that may not be moved by the user.

Other tasks may require accomplishment or handling during a prescribed date/time range, for example, some time on Friday before 6:00 p.m. According to embodiments of the invention, such date and/or timing information may be applied to tasks entered into the list authoring surface user interface 120 to apply a "fuzziness" to the timing aspect of tasks contained in the user interface. For example, if on a given day two tasks must be accomplished or otherwise handled at very specific times, then those tasks may be annotated with metadata allowing the user to sort, search or otherwise manipulate those items based on the hard dates/times applied. On the other hand, if one or more other tasks must be completed on the same day, but may be completed at any time up to a given end time, for example, 6:00 p.m., then those tasks may be annotated with a metadata type allowing those items to move in the events timeline associated with tasks that must be accomplished or otherwise handled on the prescribed day so long as the times for accomplishing or otherwise handling those items do not go beyond a prescribed outer time limit, for example, 6:00 p.m. For another example, if a user wants to mow his/her lawn in the morning and go to a specific restaurant that evening, the list authoring surface may allow capturing times like "Morning" and "Evening" in the same way that using a paper calendar they may put the mowing activity towards the top of the box for that day and the restaurant name towards the bottom of the box for that day without a specific time for either. According to an embodiment, then, sorting, searching or otherwise manipulating list items contained in the list authoring surface UI 120 may be accomplished on list items having hard date/times, or may be accomplished on list items having soft or fuzzy date/times, or a combination thereof.

The list authoring surface UI 120 may provide reminders to the user to accomplish or otherwise handle tasks contained in the list authoring surface UI 120, and the inclusion of metadata associated with hard dates/times and metadata associated with soft or fuzzy dates/times may be utilized for providing a more realistic experience to the user. For example, a reminder of an upcoming hard date/time, for example, a specific appointment, may be of one variety of reminder and a reminder associated with a soft or fuzzy date/time may be of a different type of reminder that is less urgent in comparison to a reminder associated with a hard date/time. In addition, tasks associated with a soft or fuzzy date/time may be automatically floated through a given day's schedule until a prescribed end point, for example, no later than 6:00 p.m. is approached. Thus, the reminders associated with hard date/time items as compared to soft or fuzzy date/time items may be accomplished in a way that more closely approximates how a user might remind himself or herself of such items by jotting the items down on a scrap of paper, notepad, sticky note, and the like.

As described in further detail below, the list authoring surface user interface 120 may be deployed in association with a multitude of software applications and data associated with different software application types. For example, the list authoring surface may be utilized for receiving information from or capturing information from a variety of electronic files, such as word processing documents, spreadsheet application documents, slide presentation application slides, Internet browser content, social media site content, video applications, audio applications, electronic inking, for example, handwriting electronically with a stylus and electronic writing pad, photographs, electronic mail items, calendar items, task items from other tasks, speech-to-text files, and the like. In addition, information stored for the list authoring surface may be utilized by other applications for enhancing the functionality of the list authoring surface.

Consider the example entered or captured task in the form of the phrase "Meet at Bob's Pizza Parlor at 6:00 p.m. on Friday." Once individual words or phrases in the entry are parsed, recognized, annotated, or otherwise tagged with metadata as described above, those tagged items may be utilized by other applications to enhance the functionality of the list authoring surface. For example, the business name of "Bob's Pizza Parlor" may be passed to a software application for determining a location of Bob's Pizza Parlor. The location of Bob's Pizza Parlor may in turn be passed to a global positioning system (GPS) mechanism of the user's global device, for example, a phone, personal digital assistant, etc., the time associated with the entry of "6:00 p.m. on Friday" may be passed to a calendar function utilized by the user, and any other words or phrases of interest in the phrase may be thus utilized. Now, following with this example, if the user leaves his or her office and is utilizing a mobile device, to which he has deployed the list authoring surface UI 120, as will be described below, as the user approaches the location of the example "Bob's Pizza Parlor" or as the user approaches the designated time of "6:00 p.m. on Friday," or a combination of the two, a reminder may be provided to the user via his mobile device that the time for meeting at "Bob's Pizza Parlor" is approaching, or that the location of "Bob's Pizza Parlor" is approaching, or of a combination of the above. Use of presence data (for example, location of a mobile device as determined by signal strength or GPS positioning) may also be used to relate information or task reminders in the list authoring surface to other pertinent information, such as calendar items, meeting locations, etc. In addition, if the meeting reminder is associated with a particular person or group of persons, the list authoring surface may query a contacts application for contacts information for the person or persons and make that information available through the list authoring surface UI 120.

For another example, if a user enters a task associated with the editing of a particular portion of a given word processing document, metadata associated with an identification of the particular document may be applied to the task entered into the list authoring surface user interface 120. When the user next opens the specified word processing document, a reminder may surface in the list authoring surface UI 120 to remind the user that a particular paragraph in the word processing document should be edited. According to one embodiment, if such a document is not already opened, if the user sees a reminder to edit an identified document, the document may be opened directly from the list authoring surface UI 120 by selecting the document identified in the UI 120.

Referring still to FIG. 2, one or more functionality buttons and controls may be exposed in the user interface 120, in addition to those described above with reference to FIG. 1. A reminder function 210 may allow a user to mark a given task or information item in the UI 120 for setting a desired reminder date/time. A private notification function 215 may allow a user to mark a given task or information item as "private" so that the task or information item is not exposed to other users via their list authoring surface user interfaces. As should be appreciated, the functions 210 and 215 are only examples of the many functions that may be exposed in the list authoring surface UI 120 for applying useful metadata or function to tasks or information items listed in the UI 120.

Figure 3:
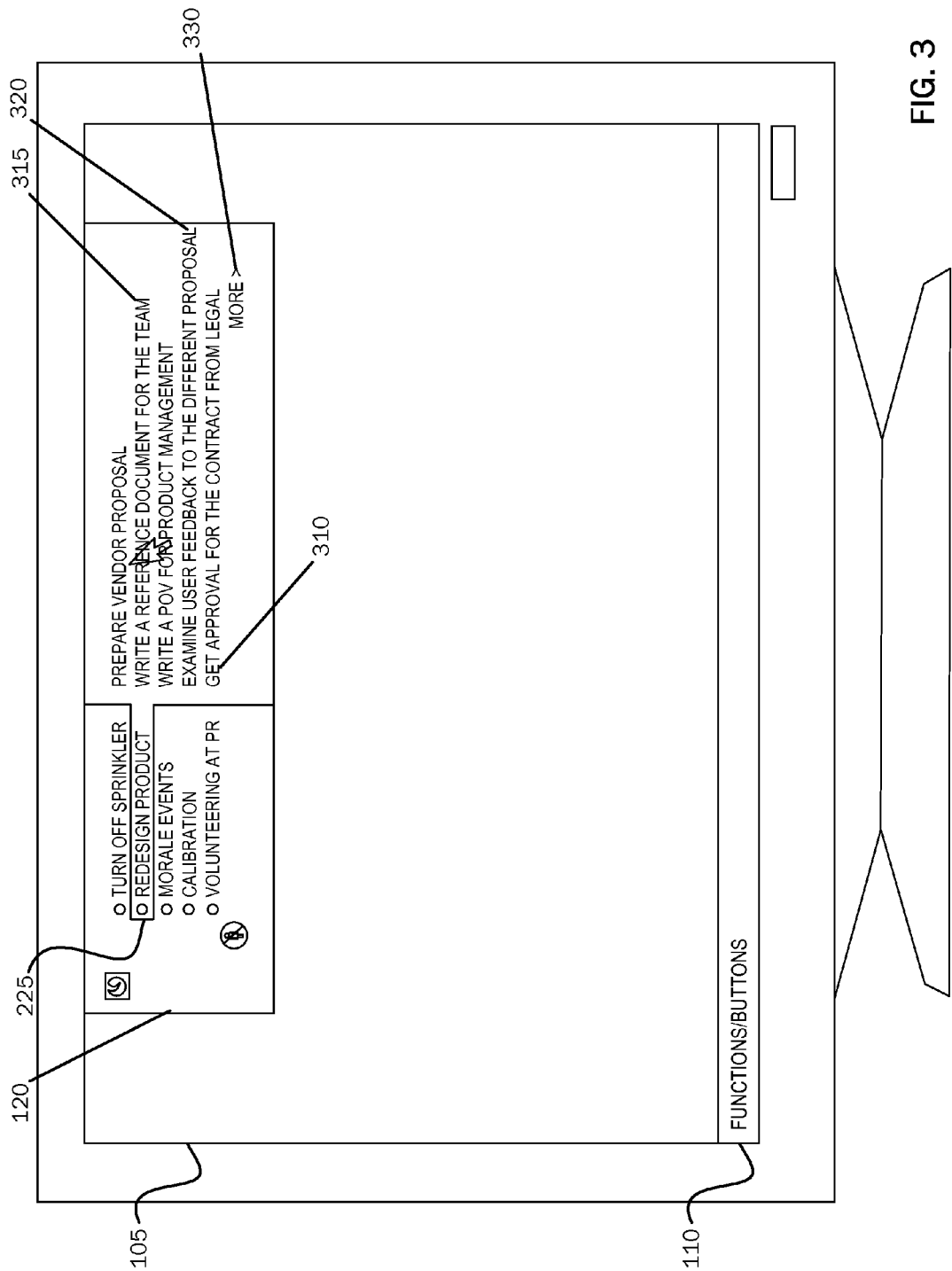
FIG. 3 is a simplified block diagram of the list authoring surface user interface of FIG. 2 showing a list of information pivoting out from a selected task item.

FIG. 3 is a simplified block diagram of the list authoring surface list user interface of FIG. 2 showing a list of information pivoting out from a selected task item. As should be appreciated, for any individual task or other piece of information entered into the list authoring surface, one or more subtasks, sub events, or sub items of information may be entered and associated with any previously entered tasks. For example, referring to FIG. 3 a variety of tasks or other pieces of information 315, 320, have been entered in association with a parent task 225 of "Redesign product." According to an embodiment, selection of the parent task 225 allows for the launching of a pivot table 310 within the list authoring surface user interface 120 for displaying the subtasks 315, 320 associated with the parent task 225. A "More" button 330 is illustrated for allowing a display of additional subtasks 315, 320 under the selected parent subtask 225 if the available size of the user interface 120 only provides for an initial display of a fixed number of tasks, events, activities or other pieces of information. According to one embodiment, a specified maximum number of displayed subtasks, for example five subtasks, may be displayed to keep the user's focus on a "top" number of important tasks. As should be appreciated, subtask information displayed in the pivot table 310 may be filtered, searched, sorted, or otherwise manipulated as is the case with information contained in the main user interface 120.

Figure 4:
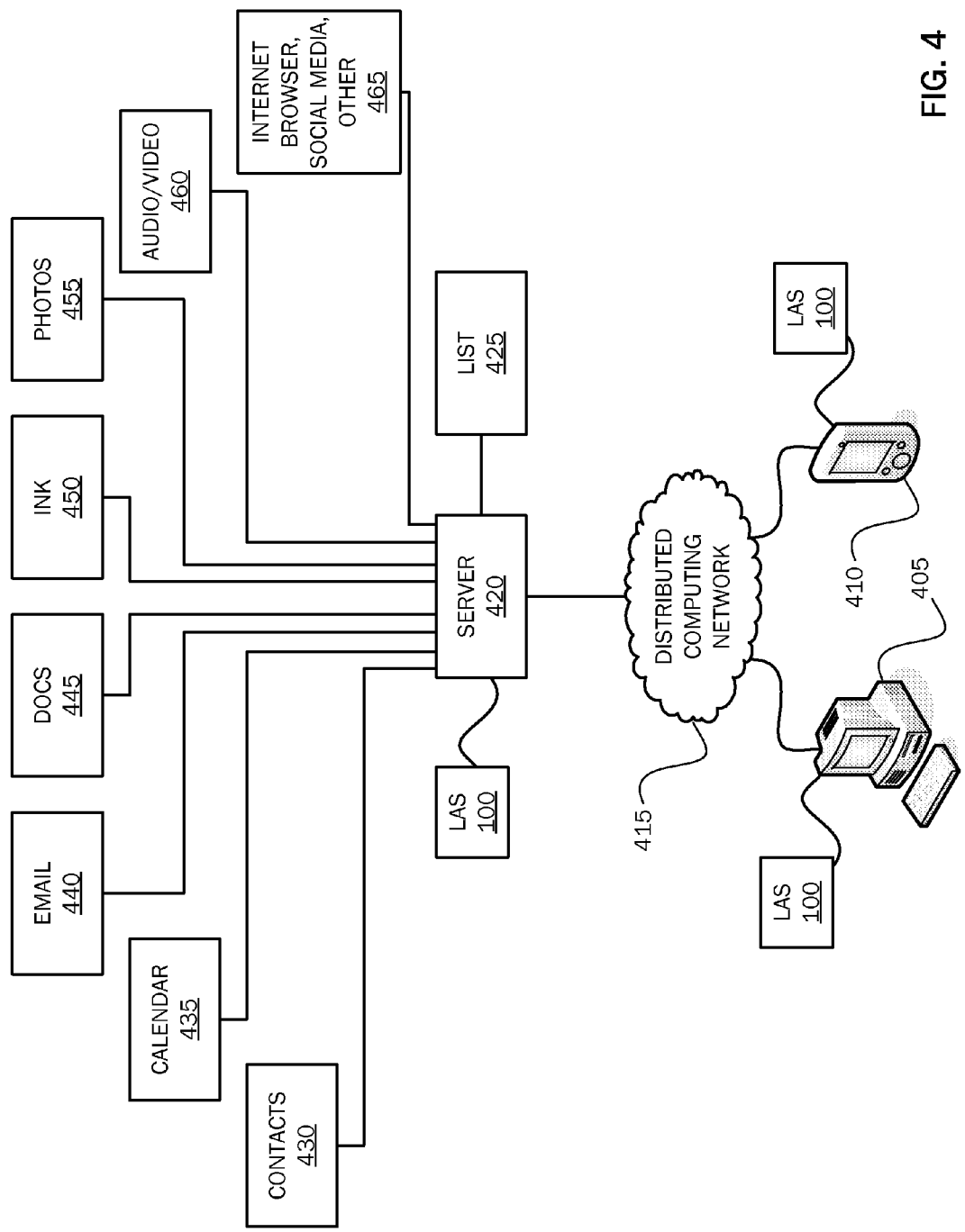
FIG. 4 is a simplified block diagram of a computing architecture in which embodiments of the present invention may be practiced.

FIG. 4 is a simplified block diagram of a computing architecture in which embodiments of the present invention may be practiced. Referring to FIG. 4, the desktop or laptop computer 405 is illustrative of any stationary computing device utilized by a user for entering, capturing or otherwise utilizing data in association with the list authoring surface described herein. The mobile device for 410 is illustrative of a mobile telephone, personal digital assistant, wirelessly connected laptop computer or any other computing device with which a user may utilize the list authoring surface in a mobile environment. The distributed computing network 415 is illustrative of any suitable means for allowing the computing devices 405, 410 to communicate with one or more applications or databases via a remote server 420, for example, the Internet, a corporate intranet, a home-based intranet, and the like.

The server 420 is illustrative of a general purpose computing device operating as a remote server on which the functionality of the list authoring surface may be maintained for allowing the list authoring surface to follow the user from one device 405 to another device 405 to a mobile device 410, or to any other device on which the list authoring surface UI 120 may be deployed for use as described herein. According to an embodiment, all functionality and data storage associated with the list authoring surface and the associated user interface 120 may take the form of a list authoring surface application or module 100 having sufficient computer-executable instructions for performing the functions described herein. The list authoring surface application or module 100 may be resident on a single computing device 405 or 410 for use in association with data accessible by the devices 405 and 410. Alternatively, the functionality and associated data for the list authoring surface and its associated user interface 120 may be maintained and operated at the remote server 420, as illustrated in FIG. 4.

The list 425 is illustrative of a database list or table accessible by the device 405 or 410 locally or via the server 420 where information entered manually or automatically into the list authoring surface and displayed via the associated user interface 420 is maintained. As should be appreciated, if the user is not in a distributed computing environment, the list 425 and associated stored data may be stored or cached on a local computing device 405, 410. That is, according to an embodiment, each instantiation of the list authoring surface may cause the generation of a list table 425 maintained in a database stored locally on the computing device 405, 410 or stored in association with the server 420.

In the list 425, each task, event, activity, or other piece of information may be assigned to and stored in a given line in the list 425. In addition to storing each individual entry, information identifying annotations applied to individual entries, for example, metadata, or other identifying information may be stored in the list 425 with the associated information entry. Moreover, if the information is associated with other data, for example, a document, calendar item, electronic mail entry, or if an entry is associated with other information, for example, global positioning system location data, date/time data, and the like, information identifying such associations may also be stored on a line in the list 425 or linked to a different list 425 with each associated task, event, activity or other piece of information entered manually or automatically into the list authoring surface. As new data is added to the list authoring surface user interface, or as data is changed in the list authoring surface, or as data contained in the list authoring surface is associated with other information, the data stored in list 425 is updated. According to alternative embodiments, the list items 425 and associated data may be stored according to a variety of different means aside from a data base line described above. For example, the list items and associated data may be stored as extensible markup language (XML) representations or similar representations across multiple linked lists, tables and the like that are available to or accessible by the list authoring surface.

Referring still to FIG. 4, a variety of information sources available to the list authoring surface are illustrated. For example, information from a contacts application or database 430 may be utilized for obtaining information for entry into the list authoring surface. Information from a calendaring application 435 and associated data storage may similarly be obtained. As will be described below with reference to FIG. 6, information from an electronic mail application and associated content 440 may be utilized for populating the list authoring surface. Information from a variety of documents 445, for example, word processing documents, slide presentation documents, spreadsheet application documents, and the like may be utilized for population of data into the list authoring surface. An ink application 450 is illustrative of an electronic pen and ink application for allowing data entry, for example, through contact of a stylus with an electronic writing pad. Photos applications/storage 455 is illustrative of any application or data storage through which photographs may be obtained and copied or moved to the list authoring surface. The audio/video application and storage 460 is illustrative of one or more means for obtaining audio or video files, for example, a recording mechanism operated through a digital or analog recording device or camera such as might be available through a mobile telephone and the like. Content for the list authoring surface may also come from Internet browsers, social media sites, or other sources 465. As should be appreciated, data and information from any other available source for electronically moving or copying or otherwise entering data may be utilized for populating the list authoring surface and its associated user interface 120 with tasks, events or other information of interest.

While the various data or information illustrated in FIG. 4 are illustrated in association with the server 420, each of these sources of data and/or information may also be directly associated with and/or stored at local computing devices 405, 410. In addition, according to embodiments, information from one or more sources to the list authoring surface is not a one-way communication. That is, according to embodiments, the list authoring surface and/or individual task lists or task list items may be linked to the source from which task list items were obtained (e.g., a word processing document), and information from the task list may be pushed back to the source. For example, if a piece of information in the form of a task item is in the LAS UI 120, that information may be pushed back to a source from which it came. As should be appreciated, a variety of mechanisms may be utilized for pushing information back to the source. A path to the source may be associated with each respective task list item. A selection of the task list item may cause exposure in the LAS UI 120 of a selectable button or control for pushing the selected item back to the source and/or for launching the source document.

Figure 5:
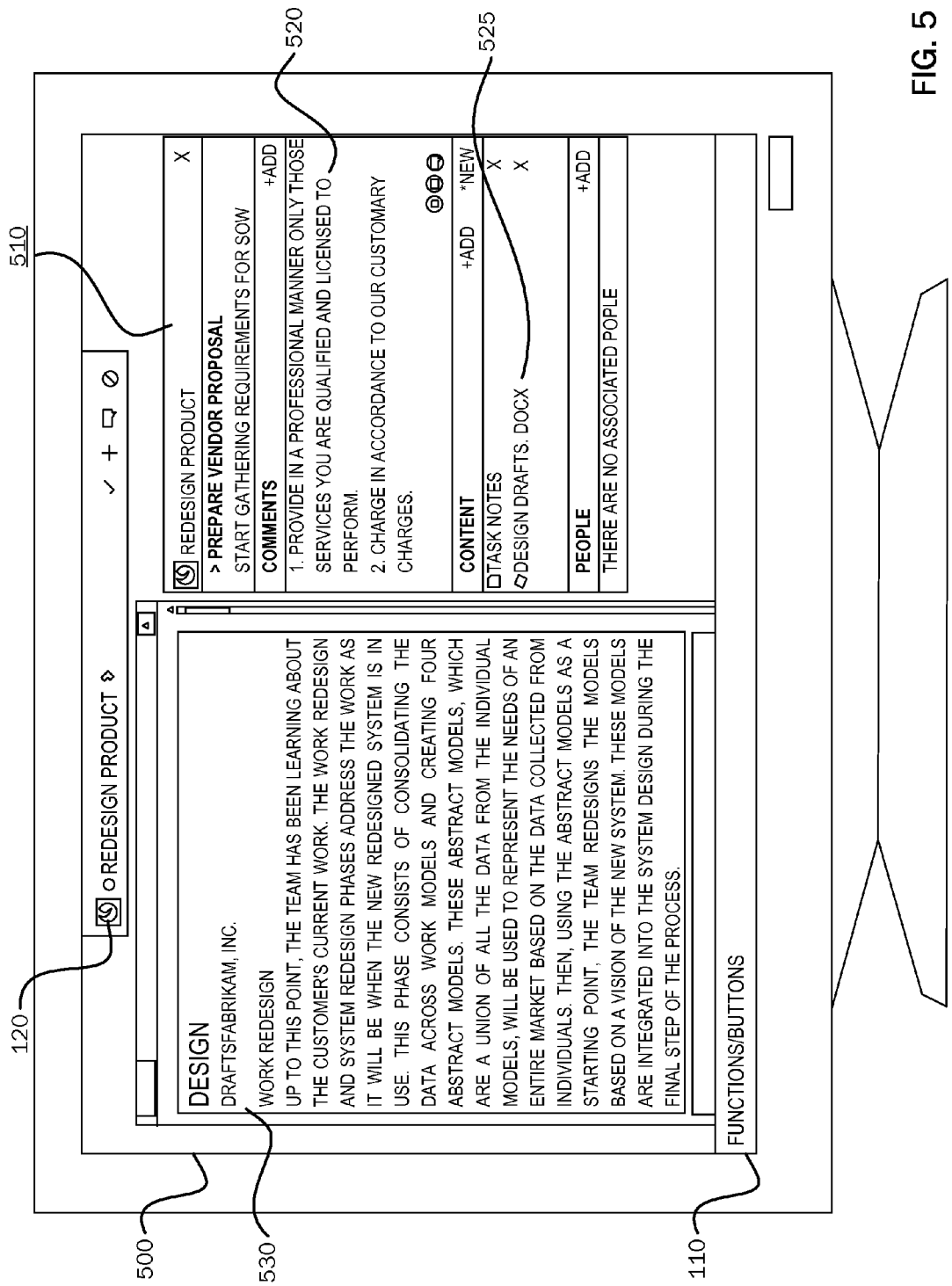
FIG. 5 is a simplified block diagram illustrating a list authoring surface user interface displayed in association with a displayed document.

FIG. 5 is a simplified block diagram illustrating a list authoring surface interface and a list authoring surface information input component in association with a displayed document. As described above, information may be entered into the list authoring surface user interface 120 manually or automatically through information capture as described below. As illustrated in FIG. 5, an example document 530 is illustrated displayed on the computer monitor display screen 500 in association with an example word processing application. According to embodiments of the invention, an expanded version of the list authoring service user interface 120 may be deployed as illustrated and described above with respect to FIGS. 2 and 3 for entering any desired information including information about or associated with a displayed document 530. According to another embodiment, a list authoring surface information input component 510 may be deployed in association with the list authoring surface user interface 120 for entering and annotating data about a given task or information item in the list authoring surface UI 120. According to the example illustrated in FIG. 5, the list authoring surface information input component 510 has been launched in association with the task "Redesign product" and displayed in the list authoring surface UI 120.

The list authoring surface information input component 510 includes a title section for providing data to identify the information being entered in association with a given task, event or other piece of information included in the list authoring surface. For example, the list authoring surface information input component 510, illustrated in FIG. 5, is identified in association with the task of "Prepare vendor proposal" which is a subtask of the parent task "Redesign product." Underneath the title portion of the list authoring surface information input component 510 is a comment section 520 for allowing a user to enter comments which may be additional tasks, events, activities or other information associated with the example subtask. For example, the comments entered in the comments section 520 may be subtasks to the subtask "Prepare vendor proposal," or the comments entered in the comments section 520 may simply be comments to remind the user of various aspects of the associated subtask.

A content section 525 is provided for allowing other content items, for example, documents, audio files, video files, or other content types to be associated with the example task or subtask. A "people" section is illustrated at the bottom of the list authoring surface information input component 510 for associating one or more people, groups of people or teams with the subtask. For example, as was described and illustrated above with respect to FIG. 2, a team grouping that may be utilized in association with a metadata tag of "@Team" may be applied to a given task or subtask. Other groupings or individual persons may similarly be associated with one or more tasks or subtasks entered into the list authoring surface and its associated UI 120. As should be appreciated, the configuration, layout and fields illustrated in the list authoring surface information input component 510 are for purposes of example only and are not limiting of other text, data entry or data annotating fields or sections that may be provided in the list authoring surface information input component 510.

Referring still to FIG. 5, the document 530 displayed on the display screen 500 is illustrative of any document, such as a word processing document, spreadsheet document, slide presentation document, notes document, tasks document, calendaring document, and the like that may be displayed on the display screen 500. As is illustrated in FIG. 5, the document 530 is being processed in some manner by a user, and the user decides to enter information into the list authoring surface via the list authoring surface information input component 510 about the displayed document. For example, as the user is editing the displayed document, the user may remember that one or more tasks should be performed in association with the project referenced in the displayed document. Thus, by launching the list authoring surface user interface 120 and subsequently launching the list authoring surface information input component 510, the user may insert tasks, comments, content items or associate the document or portions of the document or tasks associated with the document with one or more people, groups or teams of people just as the user might handwrite such notes or annotations on a scrap of paper or sticky note to remind the user subsequently to deal with those matters. According to an alternate embodiment, entering tasks or other information into the LAS UI 120 while a document 530 is opened may cause tasks or other information entered into the UI 120 to be automatically associated with the document (i.e., metadata representing the document may be applied to the entered tasks or other information).

Figure 6:
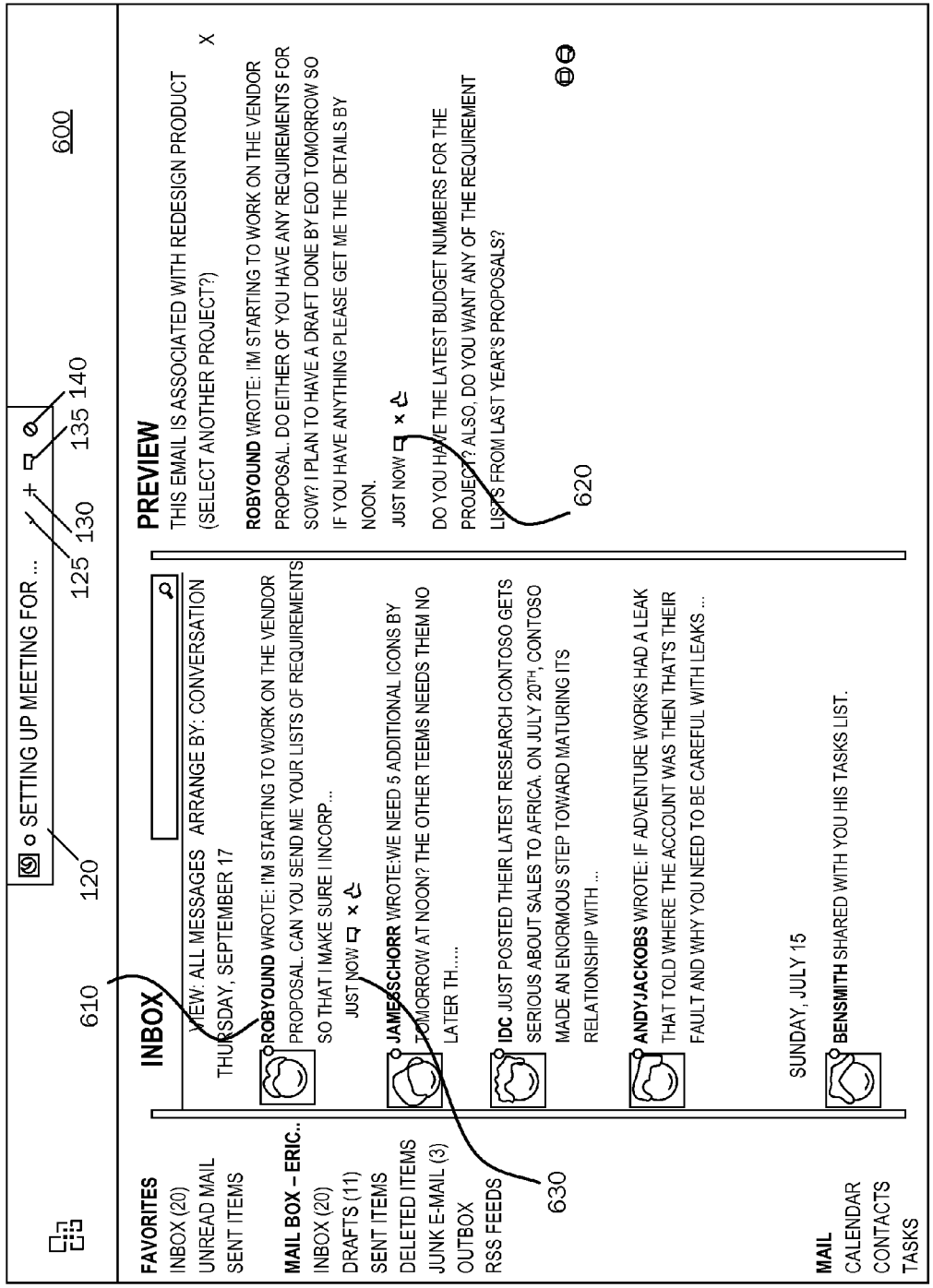
FIG. 6 is a simplified block diagram illustrating a list authoring surface user interface deployed in association with an electronic mail inbox for populating information from the electronic mail inbox into the list authoring surface.

FIG. 6 is a simplified block diagram illustrating a list authoring surface user interface deployed in association with an electronic mail inbox for populating information from the electronic mail inbox into the list authoring surface. An electronic mail inbox 600 is illustrated showing a number of electronic mail entries 610. According to embodiments of the present invention, the list authoring surface UI 120 is deployed at the top of the electronic mail user interface 600 for receiving and utilizing tasks, events, activities or any other information associated with items contained in the electronic mail user interface 600, as described herein. For example, a given electronic mail entry 610 may cause the user to desire to enter a task or other event into the list authoring surface user interface 120. As described above, the user may open the list authoring surface user interface 120 and manually type a note in such as "Remember to speak with Rob about working on the vendor proposal." Alternatively, the user may launch the list authoring surface information input component 510, illustrated and described above with respect to FIG. 6, to enter more detailed comments, to associate one or more content items with a task, event, activity or other information, to associate groupings, teams or individuals persons with one or more tasks or subtasks, and the like. That is, the user may desire to launch the list authoring surface information input component 510 in association with the electronic mail user interface 600 to manually enter a number of comments or to manually associate content or people with a task, event, activity or other information displayed in or associated with content contained in the electronic mail user interface 600.

According to an alternate embodiment, an automatic or quick capture function may be provided to allow an automatic capturing and exporting of information from a document or other file directly to the list authoring surface for storage. For example, a set of buttons/controls 620, 630 are illustrated in association with each item displayed in the electronic mail user interface 600. According to an embodiment, if a user of the list authoring surface and its associated user interface 120 desires to automatically populate the list authoring surface with an electronic mail item, for example, the user may select the desired electronic mail item and cause the electronic mail item to automatically be populated into the list authoring surface storage list 425 described above with respect to FIG. 4. Once content, for example, a given electronic mail entry 610, is automatically captured and populated into the list authoring surface, metadata may be manually or automatically associated with terms or phrases or other content items in the automatically populated entry, and natural language processing may be applied to the entry as described above. As should be appreciated, the electronic mail items illustrated in FIG. 6 are illustrative of other types of content, for example, contacts items, calendar items, items contained in other tasks applications, and the like that may be manually entered into the list authoring surface or that may be automatically captured and exported to the list authoring surface for generation of tasks, as described herein.

Figure 7:
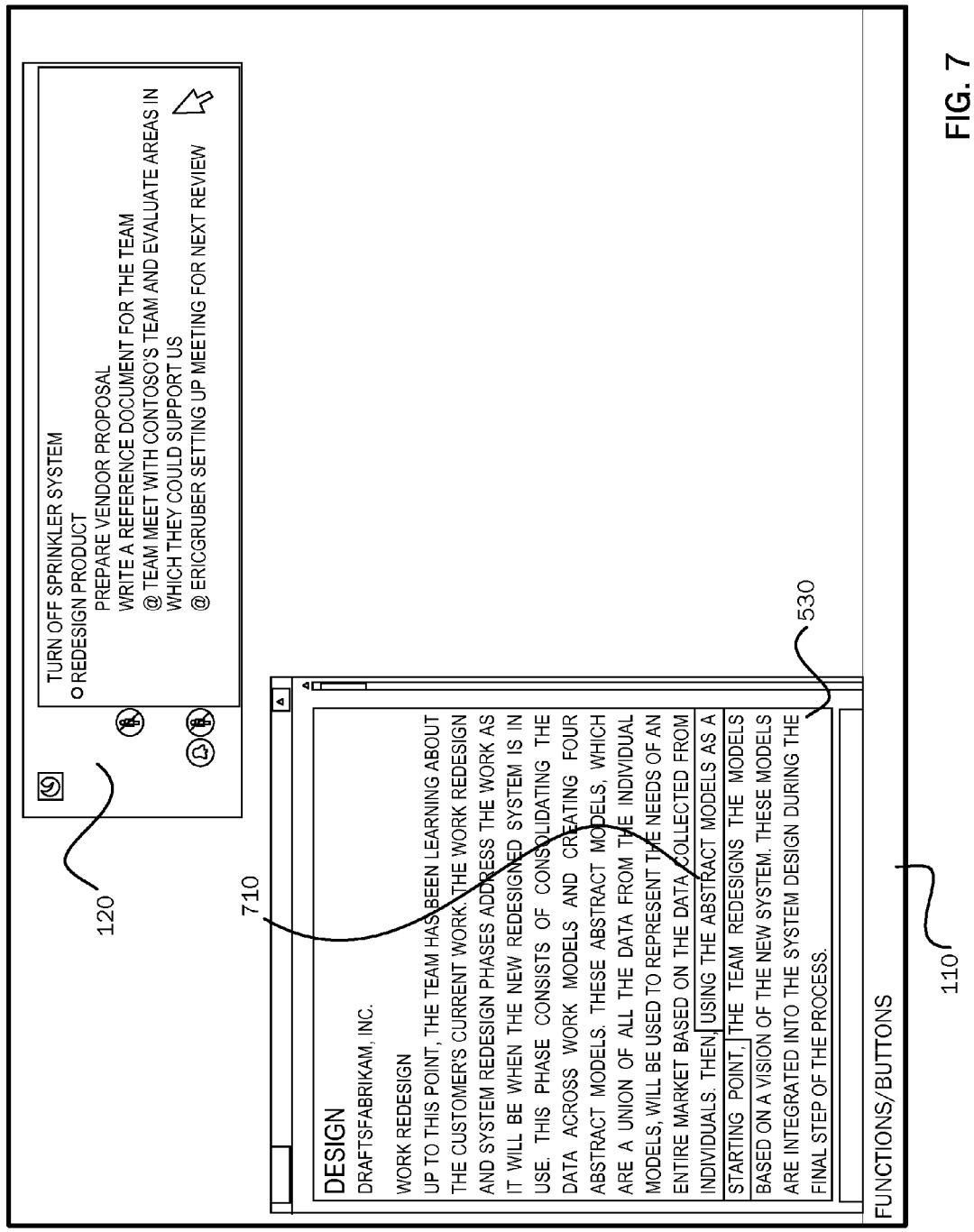
FIG. 7 is a simplified block diagram illustrating a list authoring surface user interface deployed in association with a displayed document.

FIG. 7 is a simplified block diagram illustrating a list authoring surface user interface deployed in association with a displayed document. A document 530 is displayed in an example word processing application user interface for editing by a user. In addition, an expanded version of the list authoring surface user interface 120 is deployed. The example document and the list authoring surface user interface 120, illustrated in FIG. 7, shows another example of automatically and quickly capturing information from a document or other object for inserting into the list authoring surface. For example, the text range 710 having the test string "using the abstract models as a starting point" may be highlighted and automatically exported from the document 530 into the list authoring surface user interface 120 for generation of tasks in the same manner as information from the electronic mail items were exported into the list authoring surface user interface 120 as described above with reference to FIG. 6.

According to embodiments, when information from any available object such as a word processing document, slide presentation document, spreadsheet application document, electronic mail object, calendaring object, task object, or objects of other types, such as, audio files, video files and photographs are captured and automatically imported to the list authoring surface, one or more formatting settings may be applied to the information that is exported to the list authoring surface. That is, the user of the list authoring surface may have applied one or more formatting types, for example, bullet style, paragraph style, list style, and the like to content of the list authoring surface, and then any content that is automatically exported to the list authoring surface user interface will be formatted accordingly. In the case of audio files, video files, photographs or other images, such content may be stored, displayed, or utilized according to formatting applied to the list authoring surface and its associated user interface 120. For example, for purposes of efficiency and optimization of processing of content displayed in the user interface 120 of the list authoring service, photographs placed in the list authoring surface user interface 120 may be converted to compressed thumb nail images or similar objects rather than displaying more memory intensive versions of the objects, or audio files exported to the list authoring surface may be transformed to text. In addition, information entered or otherwise populated into the user interface 120 may take a variety of other forms including selectable links to Internet-based sites, links to audio and video files, or paths to other files. As should be appreciated from the discussion of FIGS. 6 and 7, content from a variety of different applications and application types may be automatically and quickly captured for exporting from the associated documents and for importing to the list authoring surface for storage in the list 425 in association with a given task, event, activity or other piece of information, or content automatically captured and exported to the list authoring surface may take the form of its own task or subtask once it is imported to the list authoring surface.

According to one embodiment, authoring or otherwise creating or capturing lists of tasks or other information in other authoring applications, such as email applications and notes applications may be stored in the list authoring surface either on a local computing device 405, 410 or remotely via the server 420. Such lists of task or other information may then be synchronized with information a user has entered or captured into his/her list authoring surface and may be displayed in the LAS UI 120, as described herein. For example, the LAS UI 120 may be deployed inside or in association with other applications like an Internet browser, email client application, word processing application, note-taking applications, calendar application, etc. and entering a list of items in association with one of those applications may populate the LAS UI 120 and may be associated with the LAS UI 120 of other users. For example, a user may type a list of items to bring to a dinner party inside an email item the user is generating to invite others to the dinner party, and then those items may automatically appear in the user's list authoring surface UI 120. If the user's LAS UI 120 is synchronized with other users' LAS UIs, he/she may be able to then see what others are bringing to the party as they update the email.

In addition, an auto-complete functionality may be provided wherein new items and sub-lists may be auto-completed based on other items the user or other users have entered or captured in the past. For example, when packing for a trip, if a user types "pack" then all the sub-items the user had for "pack" in the past are automatically suggested for his/her list so he/she does not have to retype or remember them again. And, packing items other people whose list authoring surfaces are associated with the present user (e.g., the user's social network) may be exposed to the present user via his/her LAS UI 120. This may use search to process the many existing tasks of the present user or of other associated users.

According to an embodiment, the list authoring surface may automatically hide some items or information so the lists do not get too long. For example, when a list item has been on the user's list for more than two weeks, or two weeks past the due date, it automatically gets hidden so the user does not feel overwhelmed or guilty for things he/she has not accomplished or things he/she does not intend to accomplish. Alternatively, an expiration date may be automatically set on every item when it is added such that items are hidden from display after the expiration date passes.

As illustrated and described above with reference to FIG. 4, the list authoring surface and its associated user interface 120 may be utilized in a stationary computing system 405, or the list authoring surface may be utilized in association with one or more mobile devices 410. Advantageously, information stored in the list authoring surface in the list 425 in association with the server 420 may be deployed across a variety of applications, as described herein, and may be deployed on a user's mobile device when the user is on the go. Thus, the list authoring surface allows the user to, in effect, carry an electronic version of a "to do" list when the user leaves the desktop operating environment by having the list authoring surface and its associated user interface 120 deployed on his or her mobile computing device, such as a mobile telephone, personal digital assistant, wireless gaming device, and the like.

According to embodiments, the list user interface may be imported to the stationary computing device 405 and to the mobile computing device 410 from the remote server 420. When tasks are displayed in the list user interface, an instantiation of the list user interface may be displayed on the stationary computing device and on the mobile computing device. When changes are made to tasks in the list user interface at the remote server, the changes are passed to the stationary and mobile devices in the form of new instantiations of the list user interface displayed on the stationary computing device and on the mobile computing device. In addition, when changes are made to tasks in the list authoring surface UI 120 at either the stationary or mobile computing devices, such changes may be passed up to the list authoring surface and associated data storage at the remote server 420.

Figure 8:
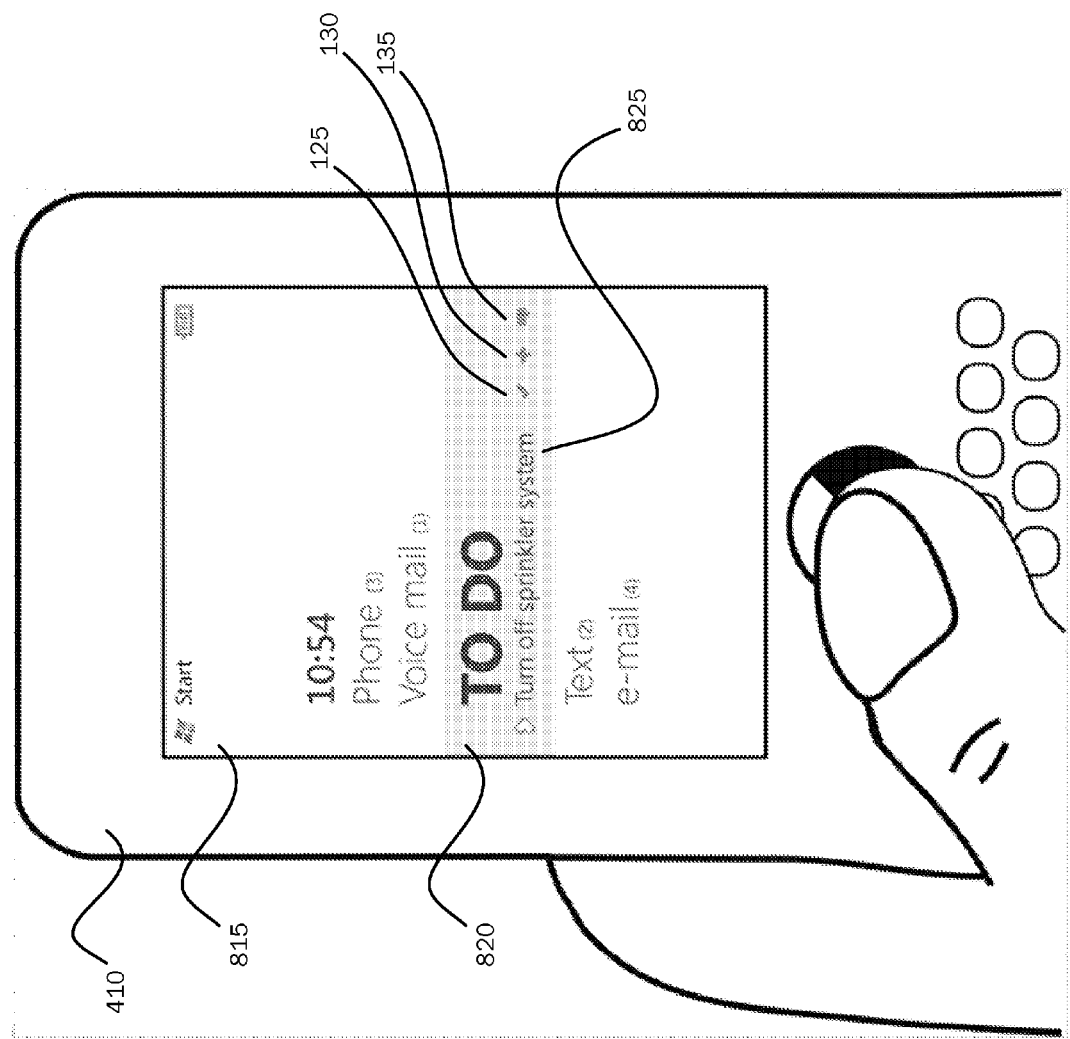
FIG. 8 is a simplified block diagram illustrating a mobile computing device and illustrating a list authoring surface user interface deployed on a display screen of the mobile computing device.
Figure 9:
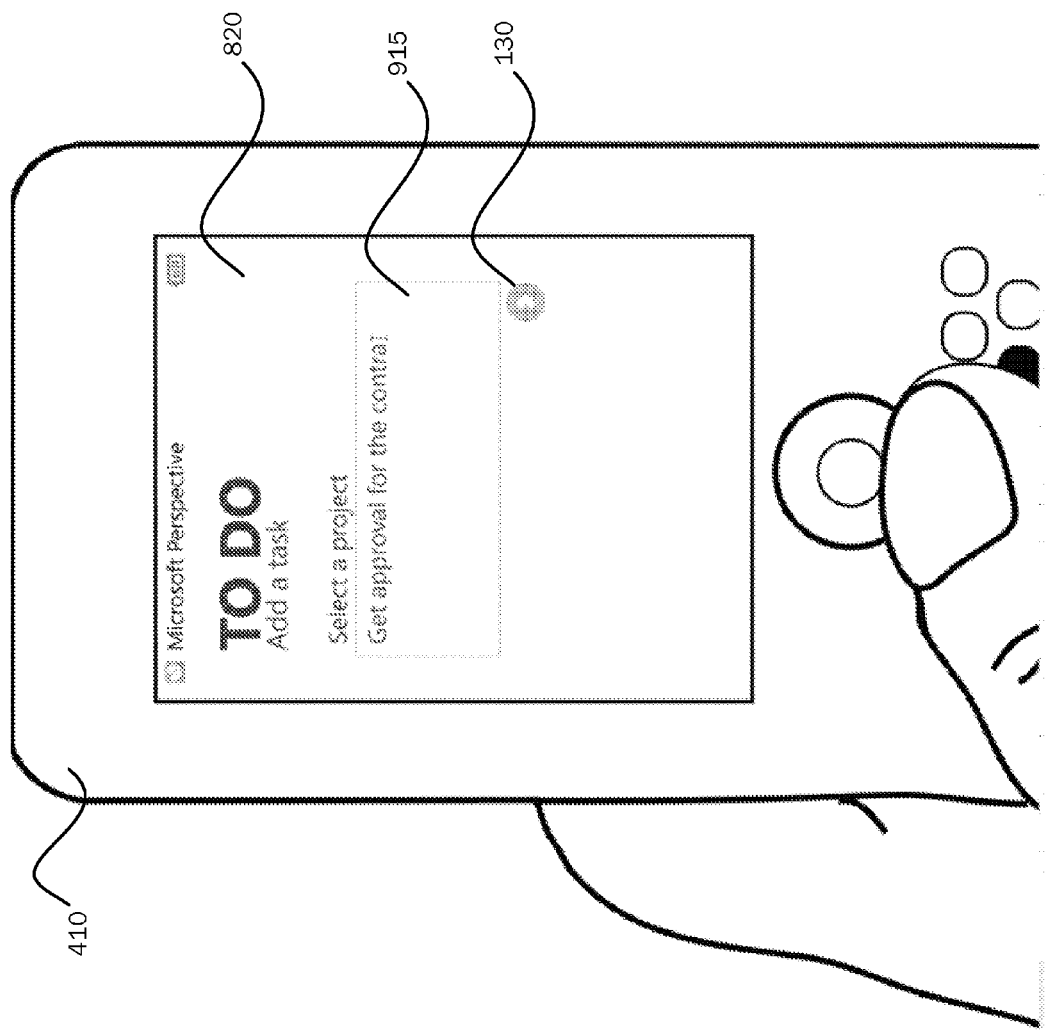
FIG. 9 is a simplified block diagram illustrating a mobile computing device and illustrating a list authoring surface user interface deployed on a display screen of the mobile computing device.

FIGS. 8 and 9 illustrate use of the list authoring surface and its associated user interface in a mobile environment. As illustrated in FIG. 8, the list authoring surface user interface 820 is illustrative of a mobile version of the list authoring surface UI 120, described above, deployed on the display screen 815 of a mobile telephone 410. Just as the user may deploy the list authoring surface user interface 120 on a display screen of his or her computer or laptop, as described above, with reference to FIGS. 1 through 7, so can the user deploy the list authoring surface user interface 820 on his or her mobile device to utilize the same functionality as may be utilized in a stationary computing environment.

Referring to FIG. 9, if the user launches the list authoring surface user interface 820, illustrated in FIG. 8, the "To do" list 825 may be launched on the display screen of the user's mobile device to allow the user to review one or more tasks, events, activities or other information or to allow the user to enter additional information, edit existing information, or otherwise manipulate existing information 915. If the user does edit or otherwise manipulate information contained in the list authoring surface user interface via his or her mobile device, the modified information may be stored at the list 425 via the server 420, and the next time the user deploys the list authoring surface user interface 120 on his or her stationary computing device, those changes or modifications made to information contained therein via the user's mobile device will appear in the user interface 120 deployed with respect to one or more other applications in the user's stationary computing environment.

In addition, the mobile device 410 may be utilized for quick capture of information that may be exported directly to the list authoring surface. For example, a camera function of a mobile telephone may be utilized for taking a photograph that may be automatically imported to the list authoring surface. For another example, global positioning system (GPS) data from the mobile device 410 or from any mobile computing device (e.g., laptop) with GPS or other location determining systems may be captured with respect to a particular location or address and may be imported to the list authoring surface.

Figure 10:
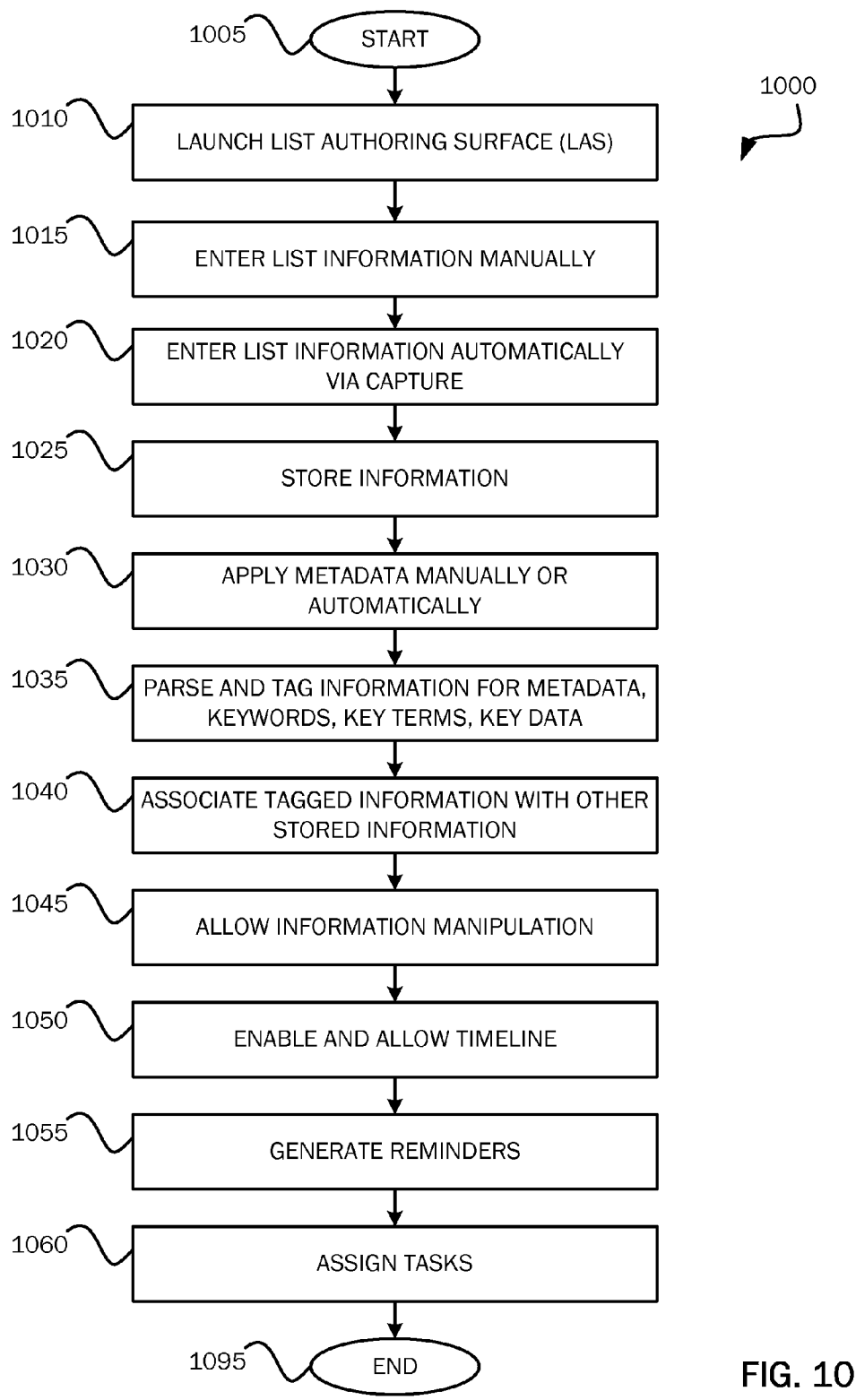
FIG. 10 is a flow chart illustrating a method for launching, populating, and utilizing a list authoring surface.

Having described features and operating environments of/for embodiments of the invention, FIG. 10 is a flow chart illustrating a method for launching, populating, and utilizing a list authoring surface. The method 1000 begins at start operation 1005 and proceeds to operation 1010 where the list authoring surface user interface 120, 820 is deployed on a stationary computing device 405 or on a mobile device 410 as described herein. As should be appreciated, a user may have launched the list authoring service user interface to simply have information contained in the list authoring surface user interface visible to the user as he or she works. On the other hand, the user may have deployed the list authoring surface user interface in order to manually enter additional information or to import information to the list authoring surface from a document or other object with which the user is working.

At operation 1015, if desired, the user may manually enter information, for example, tasks, events, activities or other information of interest to the user, or the user may enter information to the list authoring surface user interface based on content the user is presently editing. At operation 1020, if desired, the user may enter list information automatically via a capture mechanism such as described above with reference to FIGS. 6, 7 and 8.

At operation 1025, any information entered either manually or automatically by the user is stored in the list 425 via the server 420, or the information is stored locally on the user's stationary device 405 or mobile device 410. According to embodiments, when information is stored in the list authoring surface, any formatting properties designated for application to information stored in a list authoring surface are applied to the stored information. According to one embodiment, this information may not be stored, but the formatting properties would be applied in the UI 120. For example, if information entered into the list authoring surface is designated as being formatted according to bullet format, then any new information entered will be entered in bullet format.

At operation 1030, after information is manually or automatically added to the list authoring surface, metadata may be applied to one or more terms, phrases, or other content items of the entered information. For example, if the entered information is to be associated with a given work team, then the new information may be annotated with metadata associating the new information with the given work team. As described above, in addition to metadata applied to entered information, other list item attributes may also be applied to the entered information. As should be appreciated, metadata may be applied to the one or more terms, phrases, or other content items before the content items are added to the list authoring surface.

At operation 1035, the entered information may be parsed and tagged for metadata, other list item attributes, key words, key terms or key data either by identification of such key words, key terms, key data, metadata or through use of a natural language parser for identifying terms in the entered information. Alternatively, this operation may be performed prior to entering the information into the list authoring surface. At operation 1040 the tagged information may be associated with other stored tasks or other information. For example, if an entered task item is tagged with metadata or other list item attributes associated with a particular work team, then at operation 1040, the newly tagged information may be associated with other stored list authoring surface information associated with the same work team for generation of a new or modified task, or for establishing associations between a plurality of tasks.

At operation 1045, manipulation of the new information along with manipulation of information previously stored in the list authoring surface is enabled and allowed. That is, the information stored in the list authoring surface may be edited, sorted, searched, filtered or otherwise manipulated. In addition to such manipulation of listed information, a user may act on the listed information, for example, calling a listed contact item, emailing or texting a listed contact item, and the like. At operation 1050, any timelines (as broadly defined above) including hard dates/times and soft or fuzzy dates/times associated with data entered into the list authoring surface may be enabled and may be utilized for generating reminders and calendar entries at operation 1055.

At operation 1060, information entered into the list authoring surface may be utilized for assigning or generating one or more tasks associated with the entered information, and the newly assigned or generated one or more tasks may be associated with other information, including other tasks, contained in the list authoring surface or from one or more other applications and data sources the list authoring surface may access to provide a very efficient and helpful user experience. The method 1000 ends at operation 1095.

Figure 11:
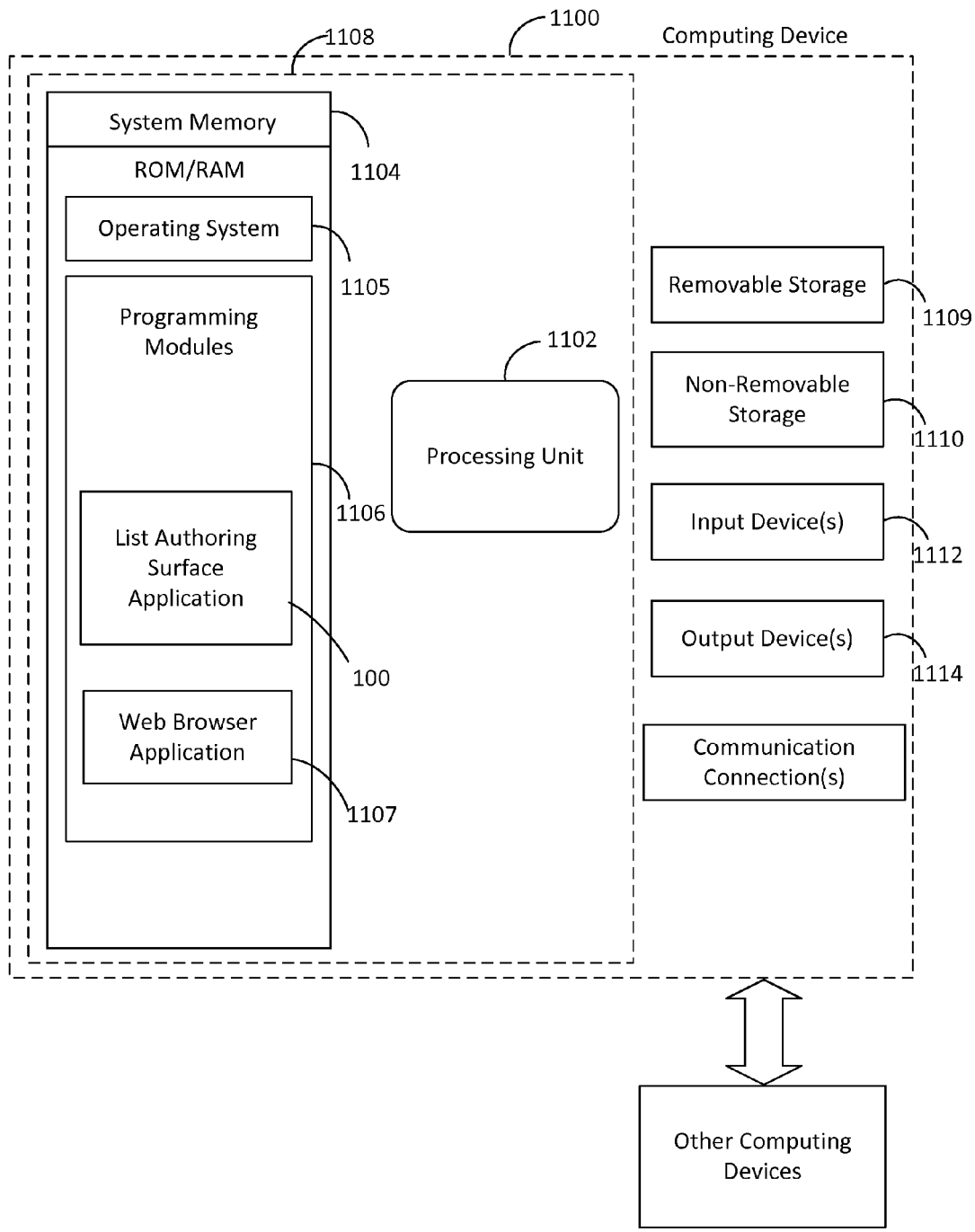
FIG. 11 is a simplified block diagram of a computing system in which embodiments of the invention may be practiced.

Having described embodiments of the present invention and an example logical flow illustrating a method for launching, populating, and utilizing a list authoring surface, FIG. 11 is a block diagram illustrating example physical components of a computing device 1100 with which embodiments of the invention may be practiced. The computing device components described below may be suitable for the computing devices described above, for example, the computing devices 405, 410 and the server and database systems 420, 425. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1107. Operating system 1105, for example, may be suitable for controlling computing device 1100's operation. Furthermore, embodiments of the invention may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110.

As stated above, a number of program modules and data files may be stored in system memory 1104, including operating system 1105. While executing on processing unit 1102, programming modules 1106, such as the list authoring surface application or module 100 described above with respect to FIG. 1 and the web browser application 1107 may perform processes including, for example, one or more method 1000's stages as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

As described herein, embodiments of the present invention are directed to a list authoring surface (LAS) that is a software application or module that enables a lightweight user interface component for entering, displaying, editing, manipulating, and providing reminders for one or more tasks, events, activities, or pieces of information that takes the place of hand-written notes, scraps of paper, "sticky" notes, memory joggers, and the like. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for populating a list user interface, comprising:
    at a computing device, importing the list user interface from a remote server;
    displaying the list user interface at the computing device;
    receiving into the list user interface a first list item;
    receiving a first text entry into the list user interface, the first text entry including a first metadata tag associated with the first list item;
    automatically parsing the first list item to determine whether the first list item should receive an application of the first metadata tag, and if the first list item should receive the application of the first metadata tag, then applying the first metadata tag to the first list item;
    applying a first list item attribute to the first list item;
    associating the first list item with the first metadata tag and the first list item attribute;
    generating in the list user interface a first task for the first list item based on the association of the first list item with the first metadata tag and the first list item attribute;
    generating in the list user interface a second task for a second list item based on an association of the second list item with the first metadata tag and the first list item attribute;
    displaying an instantiation of the first and second tasks within the list user interface on the computing device; and
    revising the first and second tasks in the list user interface in response to changes to the first and second tasks that are received from the remote server.

2. The method of claim 1, further comprising displaying the list user interface in association with any of a plurality of software application user interfaces for displaying the first task and for receiving any other list items regardless of any particular software application user interface with which the list user interface is displayed.

3. The method of claim 1, further comprising:
    displaying the second task in the list user interface relative to the first task to represent a hierarchical relationship of the second task with the first task.

4. The method of claim 3, further comprising:
    prior to generating the second task in the list user interface from the second list item, receiving a second text entry into the list user interface, the second text entry including a second metadata tag associated with the second list item;
    applying the second metadata tag to the second list item; and
    associating the second task with the first task based on an association of the first metadata tag applied to the first list item with the second metadata tag applied to the second list item.

5. The method of claim 1, further comprising manipulating the first and second tasks displayed in the list user interface based on the first and second metadata tags applied to the first and second tasks displayed in the list user interface.

6. The method of claim 5, wherein manipulating tasks displayed in the list user interface includes filtering tasks, editing tasks, searching tasks, sorting tasks and pivoting tasks.

7. The method of claim 1, wherein generating the first task for the first list item includes generating the first task for a first list user interface and further comprising:
    generating the second task for the second list item in a second list user interface; and
    automatically exporting the second task from the second list user interface to the first list user interface.

8. The method of claim 1 further comprising automatically completing generation of the second list item during entry of the first list item based on an association of the being entered second list item with a previously entered list item.

9. The method of claim 1, wherein receiving into the list user interface the first list item includes receiving a manual input of the first list item into the list user interface.

10. The method of claim 1, wherein receiving into the list user interface the first list item includes receiving an automatic input of the first list item into the list user interface.

11. The method of claim 10, wherein receiving the automatic input of the first list item into the list user interface includes capturing and exporting to the list user interface the first list item from an electronic file.

12. The method of claim 11, wherein capturing and exporting to the list user interface the first list item from the electronic file includes capturing and exporting to the list user interface the first list item from one of a word processing document, a spreadsheet application document, a slide presentation application slide, Internet browser content, social media site content, a video file, an audio file, an electronic inking file, a digital photograph, an electronic mail item, an electronic calendar item, and an electronic task application item.

13. The method of claim 1, wherein applying the first list item attribute to the first list item including applying the first list item attribute to the first list item from one of a group attribute, a person attribute, a date attribute, a time attribute, a location attribute, a name attribute, an address attribute, a telephone number attribute, an alphanumeric attribute, an audio attribute, a video attribute, and one or more customized attributes.

14. The method of claim 1, further comprising arranging the first task for the first list item in the list user interface relative to an arrangement of other tasks in the list user interface based on a specified arrangement.

15. The method of claim 14, further comprising arranging tasks in the list user interface relative to one another such that any of one or more tasks that must be performed at a particular time are arranged according to the particular time and such that any of the one or more tasks that may be performed at any time are arranged at other available times not including the particular time.

16. A computer readable storage medium containing computer-executable instructions which when executed by a computer perform a method for populating a list user interface, comprising:
- importing the list user interface to a computing device from a remote server;
- displaying the list user interface at the computing device;
- receiving into the list user interface a first list item;
- receiving a first text entry into the list user interface, the first text entry including a first metadata tag associated with the first list item;
- automatically parsing the first list item to determine whether the first list item should receive an application of the first metadata tag, and if the first list item should receive the application of the first metadata tag, then applying the first metadata tag to the first list item;
- applying a first list item attribute to the first list item;
- associating the first list item with the first metadata tag and the first list item attribute;
- generating in the list user interface a first task for the first list item based on the association of the first list item with the first metadata tag and the first list item attribute;
- generating in the list user interface a second task for a second list item based on an association of the second list item with the first metadata tag and the first list item attribute;
- receiving changes made to the first and second tasks from the remote server; and
- revising the first and second tasks in the list user interface in response to the changes made to the first and second tasks.

17. The computer readable storage medium of claim 16, the method further comprising arranging tasks in the list user interface relative to one another such that any of one or more tasks that must be performed at a particular time are arranged according to the particular time and such that any of the one or more tasks that may be performed at any time up to a particular ending time are arranged according to one or more different times as long as the one or more different times are not past the particular ending time.

18. A system for populating a list user interface, comprising:
- a processor;
- a memory storage coupled to the processor; and
- a list user interface application stored in the memory storage, the list user interface application is executed by the processor to:
- import the list user interface to a computing device from a remote server;
- display the list user interface at the computing device;
- receive into the list user interface a first list item;
- receive a first text entry into the list user interface, the first text entry including a first metadata tag associated with the first list item;
- automatically parse the first list item to determine whether the first list item should receive an application of the first metadata tag, and if the first list item should receive the application of the first metadata tag, then applying the first metadata tag to the first list item;
- apply a first list item attribute to the first list item;
- associate the first list item with the first metadata tag and the first list item attribute;
- generate in the list user interface a first task for the first list item based on the association of the first list item with the first metadata tag and the first list item attribute;
- generate in the list user interface a second task for a second list item based on an association of the second list item with the first metadata tag and the first list item attribute;
- receive changes made to the first and second tasks from the remote server;
- revise the first and second tasks in the list user interface in response to changes made to the first and second tasks.

* * * * *